United States Patent
Jones et al.

[15] 3,698,742
[45] Oct. 17, 1972

[54] CONNECTOR WITH DISCONNECT WARNING INDICATOR

[72] Inventors: Harvey W. Jones, Long Beach; Dudley A. Ryer, Jr., Westminster, both of Calif.

[73] Assignee: McDonnell Douglas Corporation

[22] Filed: Nov. 23, 1970

[21] Appl. No.: 91,994

[52] U.S. Cl. ...................285/39, 285/93, 285/321, 251/149.6
[51] Int. Cl. ..........................F16l 29/00, F16l 37/28
[58] Field of Search..251/149.1, 149.2, 149.3, 149.4, 251/149.5, 149.6, 149.7, 149.8, 149.9; 137/614.06; 285/33, 34, 36, 39, 277, 313, 321, 93, 308, 304, 315

[56] References Cited

UNITED STATES PATENTS

| | | | |
|---|---|---|---|
| 2,440,946 | 5/1948 | Hansen | 137/614.06 |
| 3,547,402 | 12/1970 | Millar | 137/614.06 X |
| 2,805,089 | 9/1957 | Hansen | 285/321 X |
| 3,345,087 | 10/1967 | Hanes et al. | 285/321 X |
| 3,429,448 | 2/1969 | Rosell | 285/321 X |
| 3,521,911 | 7/1970 | Hanes et al. | 285/321 X |
| 3,532,101 | 10/1970 | Snyder | 251/149.7 X |

*Primary Examiner*—William R. Cline
*Attorney*—Walter J. Jason, Donald L. Royer and George W. Finch

[57] ABSTRACT

A connector assembly for allowing quick disconnecting of lines in fluid or pneumatic systems. The assembly requires the use of a special disconnect key to manually disconnect the connector portions thereof and the assembly includes means to retain the key in one portion of the connector assembly until the connector portions are reconnected, at which time the key may be removed therefrom. The key optionally includes a conspicuous warning flag so that upon inspection, it is obvious when the connector assembly is in a disconnected condition.

8 Claims, 4 Drawing Figures

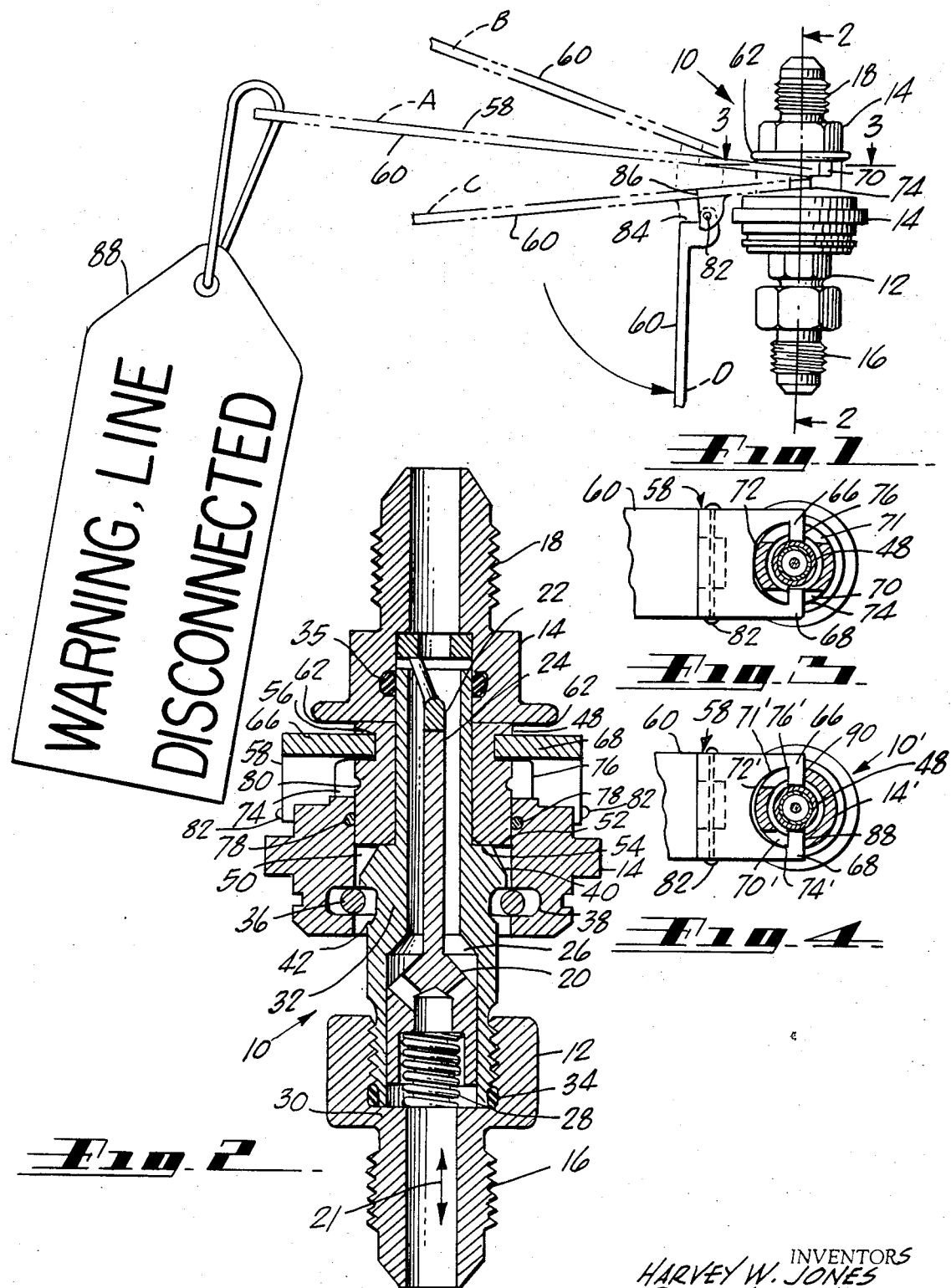

CONNECTOR WITH DISCONNECT WARNING INDICATOR

BACKGROUND OF THE INVENTION

Most fluid or pneumatic systems require the use of connectors throughout the system for maintenance and/or operational purposes and most of the known connectors for such systems are designed so that they can simply and quickly be pulled apart when a disconnect is desired. Unfortunately, there is a tendency on the part of some mechanics to neglect the reconnecting of such quick disconnect connectors after maintenance and therefore, it is often the case that such connectors are left in a disconnected condition.

Common and critical places for the use of quick disconnect connectors include the actuation and life support systems of ejection seats on high performance aircraft. In such cases the unintentional leaving of one or more connectors in a disconnected condition can result in a critical situation where one or more human lives may be lost.

BRIEF SUMMARY OF THE INVENTION

The present device includes all the preferred features of the heretofore known quick disconnect connectors; that is, it is simple to connect and disconnect. However, rather than just a simple pull, the present device requires the use of a special key to unmate and disconnect the connector portions thereof. When the disconnect key is used to disconnect the connector, the disconnect action it performs locks the key to one of the portions of the connector so it remains therewith. Attached to the key is an optional warning flag which can be made large and brightly colored to call attention to the fact that the connector is in a disconnected condition. The key with its attached flag cannot be removed from the connector portion until the connector is returned to its connected condition.

The flag, because of its large and conspicuous nature, provides a warning to maintenance and supervisory personnel that the maintenance chore has not been completed. In addition, the flag also informs personnel such as pilots who use ejection seats on which the present invention can be installed, that the ejection seat is not in a ready condition. Therefore, with a quick visual inspection for warning flags, a pilot can assure himself that the fluid and/or pneumatic lines to his ejection seat are in a connected condition before the commencement of each flight and thereby raise his confidence in the ejection seat and the systems associated therewith should their use become required.

It is therefore an object of the present invention to provide a connector assembly which provides visual warning of a disconnected condition.

Another object is to provide a quick disconnect which cannot be manually disconnected without the use of a special key.

Another object is to provide a quick disconnect which cannot be manually disconnected without locking therein a warning device.

These and other objects and advantages of the present invention will become apparent after considering the following detailed specification which discloses several embodiments of the present invention in conjunction with the accompanying drawing, wherein:

BRIEF DESCRIPTION OF THE DRAWING

FIG. 1 is a side elevational view of a connector with its disconnect key and warning flag, constructed according to the present invention;

FIG. 2 is an enlarged cross sectional view of the connector taken on line 2—2 of FIG. 1;

FIG. 3 is a cross sectional view of the connector taken on line 3—3 of FIG. 1; and FIG. 4 is a cross sectional view similar to FIG. 3 of a slightly modified connector also constructed according to the present invention.

DESCRIPTION OF THE PRESENT EMBODIMENTS

Referring to the drawing more particularly by reference numbers, number 10 in FIG. 1 refers to a quick disconnect connector constructed according to the present invention. By referring to FIG. 2 it can be seen that the connector 10 includes a nipple assembly 12 and a mating socket assembly 14 which disengage from each other when the connector 10 is disconnected. Opposite from their mating ends, the nipple and socket assemblies 12 and 14 include means for connection to fluid or pneumatic lines which means are shown as threaded fittings 16 and 18 respectively.

The nipple assembly 12 is shown including a check valve 20 which is typically included in the nipple and/or socket assemblies of such a connector 10 to prevent loss or contamination of the working medium normally transported therethrough. The check valve 20 is designed to open the passageway 21 through the connector 10 only when the connector 10 is in a connected condition and otherwise it closes the passageway 21 therethrough. The check valve 20 in the present case is opened by means of a check valve spider 22 in the socket assembly 14 which extends downwardly to abut an upwardly extending rod portion 24 of the check valve 20. When the nipple and socket assemblies 12 and 14 are pushed together for connection, the spider 22 and the rod 24 engage to force the check valve 20 downwardly away from its valve seat 26 against a valve sealing spring 28, positioned between the check valve 20 and the lower portion 30 of the nipple assembly 12.

The lower portion 30 of the nipple assembly 12 is threadably connected to the upper nipple portion 32 thereof so that the check valve 20 and spring 28 can be positioned therein. The nipple portion 32 encloses the check valve 20 and provides the surface forming the valve seat 26. A sealing device such as the O-ring 34 is usually provided between the two portions 30 and 32 of the nipple assembly 12 to prevent leaks at the threaded connection therebetween.

The upper nipple portion 32 of the nipple assembly 12 extends within the socket assembly 14 and is sealed thereto by any suitable means such as the O-ring 35 when the connector 10 is in a connected condition.

Locking means such as pawls or snap rings are usually provided in such connectors to maintain them in the connected condition and the connector 10 is shown including a snap ring 36, which is chosen to have a predetermined diameter and strength. The socket assembly 14 includes an annular groove 38 which retains the snap ring 36 therein. The upper nipple portion 32 includes an upwardly facing conical ramp 40 which engages the snap ring 36 as the nipple portion 32 is being inserted in the socket assembly 14. The snap ring 36 is expanded by the ramp 40 as it slides upwardly over the ramp face. After the nipple portion 32 has been inserted far enough inside the socket assembly 14 to form the sealed passageway 21, the snap ring 36 snaps into an annular groove 42 behind the ramp 40. The snap ring 36 thereafter retains the nipple assembly 12 within the socket assembly 14 until a predetermined force is exerted across the connector 10 to disconnect the two assemblies 12 and 14. This predetermined force is in large measure determined by the strength and diametrical characteristics of the snap ring 36 and can be as large or as small as is desired. In the present case the force required to disconnect the two portions of the connector 10 is usually larger than the force that can be applied by merely manually pulling on the two assemblies 12 and 14 thereof. Typical disengagement forces have been in the area of 300 lbs. in experimental versions of the present connector 10.

Since the connector 10, whether it includes the snap ring 36 or other locking means such as the aforementioned pawls, cannot be disconnected by mere brute manual force, unlocking means are provided such as the unlocking collar 48 shown in FIG. 2. The collar 48 is part of the socket assembly 14 and it slides vertically on a cylindrical surface 50 therein. The collar 48 includes an abutment surface 52 on the lower portion thereof which is adapted to engage an abutment surface 54 on the nipple portion 32 of the nipple assembly 12 for forcing the two assemblies 12 and 14 apart. When pawls are used as the locking means, the collar 48 includes means to disconnect the pawls as well as to force the assemblies 12 and 14 apart.

The collar 48 also includes an annular groove 56 which is adapted for engagement with a key 58 which is used to apply the required force between the socket assembly 14 and the collar 48 to disengage the assemblies 12 and 14. The key 58 enables the application of the force by means of a leverage arm 60 which extends outwardly when the key 58 is in position to disconnect the connector (position A, FIG. 1). When an upward force is applied to the arm 60 of the key 58, an intermediate portion of the key 58 abuts a shelf 62 on the socket assembly 14. The abutment point between the key 58 and the shelf 62 provides a pivot point for the key 58 so that the upward force applied to the arm 60 is multipled and applied downwardly on the collar 48 to force the nipple portion 32 of the nipple assembly 12 past the snap ring 36 to thereby disengage the two assemblies 12 and 14 (position B, FIG. 1).

The collar engaging portion of the key 58 includes inwardly extending fingers 66 and 68. The fingers 66 and 68 are designed to extend in through slots 70 and 71 in the socket assembly 14 and into engagement with the groove 56 of the collar 48 as aforesaid. The key 58 also includes a generally C shaped cutout 72 which is positioned with respect to the fingers 66 and 68 so the distance that the key 58 can be inserted within the slots 70 and 71 is restricted by contact between the back of the cutout 72 and a portion of the socket assembly 14 adjacent the slots 70 and 71 as shown in FIG. 3. This positions the fingers 66 and 68 so that they move down within lock slots 74 and 76 centrally located with respect to the slots 70 and 71 respectively as the key 58 is used to disconnect the assemblies 12 and 14. The lock slots 74 and 76 restrict the removal of the key 58 from the connector 10 except in an upwardly direction. The collar 48, however, includes means to retain it in a lowered position when the two assemblies 12 and 14 are disconnected thus trapping the key fingers 66 and 68 and the connected key 58 between the lock slots 74 and 76 and the collar groove 56 (position C, FIG. 1).

The collar locking means as shown in FIG. 2 include a snap ring 78 seated in the cylindrical surface 50 of the socket assembly 14 and a ring engaging groove 80 in the collar 48. The snap ring 78, like snap ring 36, is designed to require a predetermined force for disengagement when it is engaged with the groove 80. Typical forces in the range of 30 lbs. have been found sufficient to prevent undesired disengagement of the key 58 from the connector 10.

The 30 lbs. force could normally be provided by applying a downwardly force on the arm 60 of the key 58. The key 58 however, is provided with a hinged joint 82 and associated abutment surfaces 84 and 86 between the arm 60 and the fingers 66 and 68, as shown in FIG. 1. The hinged connection 82 and the abutment surfaces 84 and 86 allow only upward force to be exerted on the arm 60 since downward force on the arm 60 only causes the arm to pivot about the hinged connection 82 to position D, in FIG. 1. Therefore, very little upward force can be applied to the collar 48 by means of the key 58 so that without extreme difficulty, it is impossible to remove the key 58 from the socket assembly 14 when the connector 10 is in a disconnected condition. This means that whenever the connector 10 is not in a connected condition the key 58 is locked to the socket assembly 14 thereof. As aforesaid, a large and conspicuous warning flag 88 can be connected to the key 58 to warn maintenance or other personnel of the disconnected line condition.

To reconnect the nipple and socket assemblies 12 and 14, they are pushed together so the abutment surface 54 of the nipple assembly 12 contacts with the abutment surface 52 of the collar 48 forcing it upwardly past the snap ring 78. The force required to override the snap ring 78 can easily be applied manually to the two assemblies 12 and 14 since as aforesaid, it is in the range of 30 lbs. When the two assemblies 12 and 14 are reconnected, the key can be slid sidewardly out of the slots 70 and 71, thus allowing removal of the key 58 and the warning flag 88 from the area of the connector 10.

FIG. 4 shows another connector 10' which is slightly modified so that the C shaped cutout 72' of the key 58 need not have accurate dimensions. This is done by providing slots 70' and 71' which pass only partially through the socket assembly 14' so that the back surfaces 88 and 90 of the slots 70' and 71' also form the back surfaces of the lock slots 74' and 76'. The fingers 66 and 68 of the key 58 when inserted in the connector 10', abut the back surfaces 88 and 90 of the slots 70' and 71' so the fingers 66 and 68 are positioned properly to descend into the lock slots 74' and 76' when the key 58 is used to disconnect the connector 10'.

Thus, there has been shown and described novel connectors with warning indicators therefor which fulfill all of the objects and advantages sought therefor. Many changes, alterations and other modifications and uses of the subject connectors will, however, become apparent to those skilled in the art after considering this specification and the accompanying drawing. All such changes, alterations, uses and modifications, which do not depart from the spirit and scope of the invention are deemed to be covered by the invention which is limited only by the claims which follow.

What is claimed is:

1. A connector assembly for attaching lines and for indicating a detached condition thereof including:

a first connector portion adapted for connection to a first line;

a second connector portion adapted for connection to a second line, said second connector portion including locking means to lock said second connector portion to said first connector portion in an attached condition; and unlocking means to unlock said locking means of said second connector portion so that said first and second connector portion can be detached;

said second connector portion also including retention means to retain said unlocking means therewith when said first and second connector portions are detached and to release said unlocking means when said first and second connector portions are attached.

2. The connector assembly defined in claim 1 wherein said unlocking means include:

means which make said unlocking means conspicuous.

3. The connector assembly defined in claim 1 wherein said unlocking means include:

means to prevent substantial force from being transmitted therethrough in one predetermined direction to remove said unlocking means from said retention means.

4. The connector assembly defined in claim 1 wherein said unlocking means include a key having:

inwardly facing fingers at one extremity thereof for applying unlocking force to said locking means;

a leverage arm forming the opposite extremity of said key; and a hinged portion between said extremities, said hinged portion being adapted to allow sufficient force to be transmitted therethrough from said leverage arm to said fingers in a first direction to unlock said locking means but in the direction opposite said first direction allowing transmission therethrough of insufficient force to enable removal of the key from said retention means of said second connector portion.

5. The connector assembly defined in claim 1 wherein said unlocking means include a key having:

inward facing fingers at one extremity thereof for applying unlocking force to said locking means; and a leverage arm forming the opposite extremity of said key; and wherein said second connector portion includes:

means against which an intermediate portion of said key can pivot so that force applied to said leverage arm in said first direction is applied in an opposite direction by said fingers to unlock said locking means.

6. The connector assembly defined in claim 1 wherein said unlocking means include:

a key with inwardly facing fingers at one extremity thereof for applying unlocking force to said locking means; and wherein said retention means of said second connector portion include:

a pair of T shaped slots in opposite side faces of said second connector portion;

key finger engaging means adapted to move vertically with respect to said T shaped slots; and means to releasably hold said key finger engaging means in position to retain said key fingers in the bottoms of said T shaped slots.

7. A connector assembly for attaching medium containing lines including:

a first connector portion adapted for connection to a first medium containing line;

a second connector portion adapted for connection to a second medium containing line, said second connector portion including locking means to lock said second connector portion to said first connector portion in an attached condition until a predetermined detaching force is applied thereacross, means adapted for engagement with means to apply said predetermined detaching force across said connector portions, and means for retaining the detaching force applying means to said second connector portion when said first and second connector portions are detached, said means for retaining said force applying means including at least one slot positioned to cooperate with said means adapted for engagement with the detaching force applying means so that the detaching force applying means are retained therebetween as said first and second connector portions are detached.

8. The connector assembly defined in claim 7 wherein said means adapted for engagement with the detaching force applying means include:

a collar adapted for sliding movement within said second connector portion, said collar having an annular groove thereabout which is positioned to cooperate with said slot to retain the detaching force applying means.

* * * * *